M. B. RYAN.
NON-SKID CHAIN.
APPLICATION FILED AUG. 19, 1918.
1,400,320.
Patented Dec. 13, 1921.
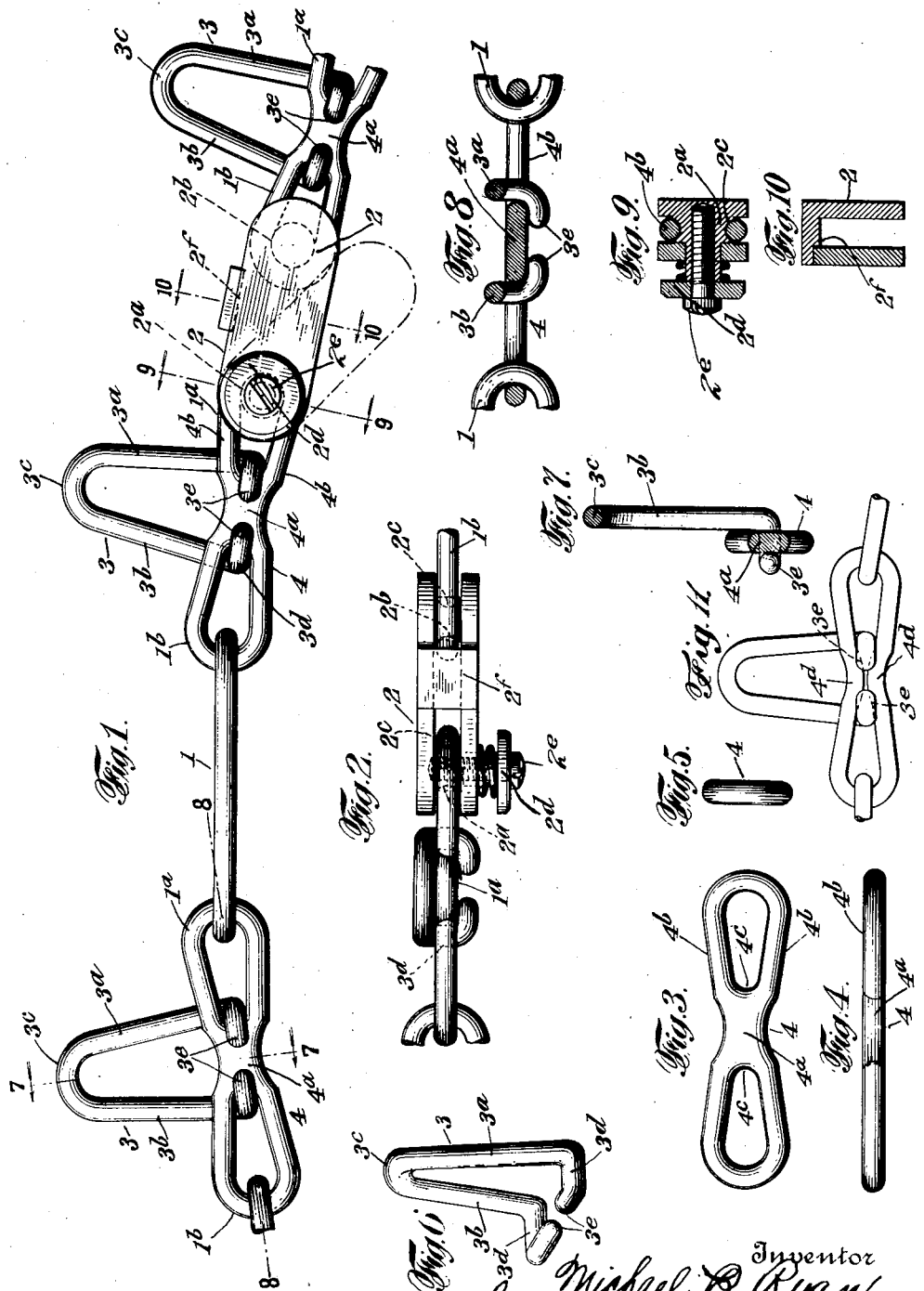
Inventor
Michael B. Ryan,
By his Attorneys
Prindle, Wright & Small

UNITED STATES PATENT OFFICE.

MICHAEL B. RYAN, OF MILFORD, CONNECTICUT, ASSIGNOR TO OFF 'N' ON CHAIN CORPORATION, OF NEW YORK, N. Y., A CORPORATION OF DELAWARE.

NON-SKID CHAIN.

1,400,320.   Specification of Letters Patent.   Patented Dec. 13, 1921.

Application filed August 19, 1918. Serial No. 250,413.

*To all whom it may concern:*

Be it known that I, MICHAEL B. RYAN, of Milford, in the county of New Haven and in the State of Connecticut, have invented a certain new and useful Improvement in Non-Skid Chains, and do hereby declare that the following is a full, clear, and exact description thereof.

The object of my invention has been to provide improvements in chains to prevent automobile and truck wheels from skidding, which improvements shall have the advantages, among other advantages, of enabling the cross chains to be readily detached from the side chains without necessitating the cutting of any link, and of affording a convenient but secure detachable fastening for the side chains, so that they can readily be applied to or removed from the wheels, and to such end my invention consists in the improvements in non-skid chains hereinafter specified.

In the accompanying drawings:

Figure 1 is a side elevation of a portion of a non-skid chain embodying my invention;

Fig. 2 is a plan view of a portion of a chain as shown in Fig. 1;

Figs. 3, 4 and 5 are respectively a side view, a plan and an end view of the link of the side chain, which is adapted to be engaged by the detachable link of the cross-chain;

Fig. 6 is a detached perspective view of a cross chain link;

Figs. 7 and 8 are sectional views of Fig. 1 taken on the lines 7—7 and 8—8;

Figs. 9 and 10 are, respectively, sections taken on the lines 9—9 and 10—10 of Fig. 1;

Fig. 11 is a side elevation of a construction alternative to the side-chain link shown in Fig. 1, which is adapted to be engaged by the detachable cross-chain link.

My invention is capable of embodiment in many different forms, and while I have chosen for the purpose of illustrating my invention that embodiment of it which is the best one known to me, such embodiment is to be regarded as only typical of many possible embodiments.

In the illustrated embodiment, I have provided a chain 1, which is to extend around the rim of the wheel and which I shall term the side chain, and which chain is preferably provided with a detachable fastening so that it may be readily applied to or removed from the wheel. I have provided an improved form of detachable fastening which, in the present instance, consists of a base 2, having posts $2^a$ and $2^b$ formed at its ends, each of said posts being provided with a groove or neck $2^c$, over which posts the end links $1^a$ and $1^b$ of the chain may be passed and in which grooves they may be seated. In order to prevent said links from escaping from the posts, I provide one of the posts $2^a$ with a latch $2^d$, the latch being secured to said post as by a screw $2^e$ upon which the latch is pivoted. I also preferably provide the latch with a spring which normally tends to hold it against a ledge or shoulder $2^f$ formed on the base in such position that the end of the latch when resting against said shoulder overlies the opposite post $2^b$. The spring in the present instance is coiled about the screw and one end is fastened to the post and the other end to the latch.

When it is desired to place the link $1^b$ upon the post $2^b$ or to remove it therefrom, it is only necessary to swing the latch into the position shown by the dotted lines, thus exposing the post so that the link can be passed over the post to engage it. The post $2^a$ may be made small enough relative to the link $1^a$ so that the latter may be passed over the latch and post, if desired, or the latch may be removed by unscrewing the screw in order to put the link $1^a$ in place, this operation only being necessary when the latch is first applied to the chain, and not being necessary when the chain is applied to or removed from the wheel.

My detachable fastening is practically self-cleaning and would not ordinarily be rendered inoperative by accumulation of dust or dirt. I prefer to place the latch and shoulder $2^d$ and $2^f$ on the side of the chain nearest to the hub so that the action of centrifugal force will tend to keep the latch seated against the said latch or shoulder, rather than to move it in the opposite direction.

The principal wear is upon the cross chains, for they are the ones which come in contact with the ground, and it is a common occurrence for these chains to break. The cross chains are ordinarily permanently fastened in place by bending the links connecting them with the side chains and they cannot be removed from the side chains except by cutting the end links or by bending operations not practicable with the tools ordinarily carried on an automobile or truck. When a cross chain breaks, it flies outward from the rim of the wheel, threshing against the mud guard and the pavement, doing damage to the former and making a very unpleasant sound. An object of my invention has been to so construct the non-skid chain that the cross chain, while being securely fastened to the side chains, shall yet be readily detachable therefrom and preferably by the use of ordinary tools, such as an ordinary pair of pliers. In the illustrated embodiment, I have provided at the ends of the cross chains links 3, which are preferably formed of material having more or less spring and consist of legs 3ª and 3ᵇ united by a connection or bend 3ᶜ. At the end of each link is a hook 3ᵈ which, as seen in Fig. 6, is bent upward in a plane perpendicular to the plane of the legs, so that it can engage the link 4 on the side chain and resist the pull of the cross chain. Each leg is also provided with a projection or spur 3ᵉ, which is preferably formed on the end of the hook 3ᵈ, the said spurs being adapted to overlie a part of the link 4 when the link 3 is in normal or unsprung condition, said spurs being moved from over the said part of the said link when the link 3 is in sprung condition. In the present instance, I have shown the spurs as projected toward each other and adapted to overlie a part 4ª of the link 4, which part, in the present instance, is in the form of a connection or cross bar between the side bars or wires 4ᵇ of the link.

I prefer to form the connection 4ª by welding together the side bars or wires 4ᵇ and forming seats 4ᶜ for the hooks, while the metal is still hot from the welding.

It will be seen that the hook 3 can be disconnected from the link 4 by simply springing one of the projections 3ᵉ away from the other until the first one no longer overlies the connection or bar 4ª. This can be done by engaging the projection to be removed with one jaw of an ordinary pair of pliers, the other jaw thereof engaging the adjacent end of the link 4. Upon forcing the handles of the pliers toward each other, the jaws will also be forced toward each other, thus withdrawing the said projection from over the connection or cross bar 4ª, and the adjacent hook 3ᵈ and the projection can be passed through the eye of the link, thus disengaging the link 3 from the eye of the link 4. The pull of the cross chain is resisted entirely by the hooks 3ᵈ, the projections being necessary only to prevent accidental detachment of the two links. The extent to which the projections overlie the link 4 can therefore be made very slight, so that little springing of the link 3 is required to detach it. It is not necessary that the projections overlie the cross bar or that there be any cross bar for the projections to overlie or otherwise engage. For instance, if the side strands 4ᵈ of the side link merely approach each other a lateral distance less than the diameter of the projections 3ᵉ, the latter will overlie the said side strands sufficiently to form a serviceable fastening as shown in Fig. 11. While it is desirable to have two projections, a single projection will accomplish the purpose.

My improved non-skid chain will be seen to be very convenient. The side chains can readily be applied to or removed from the wheel. When a cross chain breaks, it is not necessary to permit the chain to fly loose hammering the mud guard and the road to the end of the trip, as is frequently done with non-detachable cross chains, nor to perform a comparatively difficult operation to disconnect the cross chain, but the cross chain, constructed according to my invention, can be readily detached by the tools ordinarily at hand, either in the manner described, or in other ways, such as by driving a tapered object, like a chisel or screw-driver, between the two projections of the link 3.

My side link 3 may of course be formed of non-elastic material. It not only affords a convenient means for detaching a broken cross chain, but also for applying a new side chain in place thereof.

I claim:

1. In a chain of the class described, the combination of a side-link, and a cross-link having means adapted to engage said side-link and having locking means adapted to engage said side-link by a movement transverse to the direction of the cross-chain.

2. In a chain of the class described, the combination of a side-link, and a cross-link having a shoulder adapted to engage said link and having locking means adapted to engage or disengage said side-link by a movement transverse to the direction of the cross-chain.

3. In a chain of the class described, the combination of a side-link, and a cross-link having shoulders adapted to engage said link and having a projection adapted to engage or disengage said side-link by a movement transverse to the direction of the cross-chain.

4. In a chain of the class described, the combination of a side-link, and a cross-link having shoulders adapted to engage said link, and having projections adapted to engage or disengage said side-link by a movement transverse to the direction of the cross-chain.

5. In a chain of the class described, the combination of a side link, a cross link having hooks adapted to engage said side link and having a projection adapted to overlie or be removed from a portion of said side link by a movement transverse to the direction of the cross chain.

6. In a non-skid chain, the combination of a side link, a cross link having legs each carrying a hook, and projections on said hooks adapted to overlie portions of said side link or to be removed therefrom by movement transverse to the direction of said side chain.

7. In a non-skid chain, the combination of a side link, a cross link having legs and having hooks carried by said legs, said hooks projecting transversely to the portions of said side link adapted to be engaged thereby, said legs also carrying projections adapted to overlie or to be withdrawn from portions of said side link by a movement transverse to planes of said hooks.

8. In a non-skid chain, the combination of a side link, a cross link having legs carrying hooks adapted to engage said link, and projections carried by said legs and extending toward each other, said side link having a portion adapted to be engaged by said projections when said side link is in normal position.

9. In a non-skid chain, the combination of a side link, a cross link having legs carrying hooks adapted to engage a wire, of which said side-link is formed, and projections carried by said legs and extending toward each other, said side link having a means adapted to be engaged by said projections when said side link is in normal position, said means of said side link being formed by the approach of the wires of which the sides of the said link are formed toward each other closer than the width of said projections.

10. In a chain of the class described, the combination of a side link, a cross link formed of elastic material having hooks adapted to engage said side link and having a projection adapted to overlie or be removed from a portion of said side link by a movement transverse to the direction of the cross chain.

11. In a non-skid chain, the combination of a side link, a cross link formed of elastic material having legs and having hooks carried by said legs, said hooks projecting transversely to the portions of said side link adapted to be engaged thereby, said legs also carrying projections adapted to overlie or to be withdrawn from portions of said side link by a movement transverse to planes of said hooks.

12. In a non-skid chain, the combination of a side link, a cross link of elastic material having legs carrying hooks adapted to engage a wire of which said side link is formed, and projections carried by said legs and extending toward each other, said side link having a means adapted to be overlaid or engaged by said projections when said side link is in normal position, said means of said side link being formed by the approach of the side strands of the side link toward each other closer than the width of said projections.

13. In a non-skid chain, a detachable connection for a side-chain comprising the combination of a part having a shoulder transverse to the direction of the chain and a part adapted to obstruct access to said shoulder and movable only in directions transverse to the movement of the link in disengaging said shoulder.

In testimony that I claim the foregoing I have hereunto set my hand.

MICHAEL B. RYAN.

Witnesses:
EDWIN J. PRINDLE,
RUTH J. RIEMAN.